United States Patent

[11] 3,587,021

[72] Inventor Bertram W. Baumbach
Arlington Heights, Ill.

[21] Appl. No. 843,714
[22] Filed July 22, 1969
[45] Patented June 22, 1971
[73] Assignee Reliable Electric Company
Franklin Park, Ill.

[54] LINE PROTECTOR FOR A COMMUNICATIONS CIRCUIT
16 Claims, 11 Drawing Figs.

[52] U.S. Cl. .......... 337/32
[51] Int. Cl. .......... H01h 37/76
[50] Field of Search .......... 337/31, 32, 407, 408, 409

[56] References Cited

UNITED STATES PATENTS 3,255,330 6/1966 MacKenzie et al. .......... 337/32

*Primary Examiner*—Bernard A. Gilheany
*Assistant Examiner*—Dewitt M. Morgan
*Attorney*—Olson, Trexler, Wolters & Bushnell

ABSTRACT: A plug-in line protector of small size for a communications circuit for protection of personnel and inside equipment against overvoltage, overcurrent, or both. An overvoltage of short duration applied to the protector arcs across an airgap to ground, while overvoltage of longer duration generates heat that melts a solder pellet permitting a spring-pressed contact member to establish a metallic path from line to ground. Following such action, the contact member and associated solder can be removed and replaced by a new member and solder pellet. The protector also contemplates an overcurrent protective means having a printed circuit insulating member movable from a normal inward position by a spring means to an outward position when subjected to an overcurrent condition. The movable printed circuit insulating member has a heat-responsive mechanism, including a ratchet wheel and pawl means, actuated by a heat coil to sense an overcurrent condition. When the printed circuit insulating member is moved from inward to outward position as a result of an overcurrent condition on an incoming line terminal of the protector, the incoming terminal is connected to ground through a metallic path and the outgoing terminal of the protector leading to inside equipment is disconnected from the circuit. The protector has visual means for locating readily a circuit exposed to an overcurrent condition, and also an auxiliary circuit for energizing an audible device to provide supplementary indication of the condition. The overcurrent protective means following an instance of operation readily may be reset by manually moving the printed circuit insulating member to inward position, thereby conditioning the protector for response to a subsequent overcurrent condition. In the illustrated embodiment, the protector has two incoming terminals and two outgoing terminals. An overvoltage of longer duration on either incoming terminal will melt the aforesaid solder pellet and provide a metallic path to ground for both incoming terminals, thereby maintaining the associated communications circuit in balanced condition.

INVENTOR
Bertram W. Baumbach
by Brangley, Clayton, Mullin, Dithmar & Vogel Att'ys

LINE PROTECTOR FOR A COMMUNICATIONS CIRCUIT

BACKGROUND OF THE INVENTION

The invention relates to a line protector of the plug-in type for a communications circuit. Such a protector is located between an outside communication line and inside equipment, for example, central office switching equipment. Line protectors of the present type protect inside equipment from fault conditions on the outside line, such conditions generally being overvoltage of short time duration, overvoltage of longer time duration, and low voltage overcurrents. The protector of the invention functions in response to each of these fault conditions on the line, and insures that there will be no damage to the inside equipment or to personnel.

The closest approach to the present invention is believed to be U.S. Pat. No. 3,255,330. The apparatus of said patent, generally speaking, is designed to perform essentially the same functions as subject protector. The two differ widely in structure and mode of operation, however, as will be seen.

SUMMARY OF THE INVENTION

The line protector of the invention is a plug-in module for a communications circuit. In broadest aspect the protector may serve a single communications line, but since a communications circuit usually has two lines, the protector illustrated and described herein is designed to serve the two lines of a circuit. Some of the appended claims, however, are directed to a single line protector.

The protector of the invention designed for the two lines of a communications circuit has two independent internal circuits contained in a plug-in protector module. Each circuit provides protection against both overvoltage (of short and prolonged duration) and overcurrent. The circuit elements are contained within a relatively small, dustproof housing of insulating material which has snap-on latching relation with an associated base. Thus, the housing is removable by simply releasing the snap-on latch when there is need to inspect and possibly replace the circuit elements of the protector.

When an overvoltage of short duration is applied to either or both of the incoming lines connected to the protector, the protector responds, and provides a path to ground so the overvoltage does not reach equipment, such as central office equipment, connected to the protector. In the form of the invention here illustrated, an overvoltage of short duration generates an arc across a gap between two carbon blocks, thereby grounding harmlessly the currents flowing through the gap. Such an overvoltage condition produces no physical change in the protector, so the protector repeatedly will function in response to such faults without requiring attention.

When an overvoltage fault is of prolonged duration, the current passing through the gap generates sufficient heat to melt a fusible pellet. In this circumstance both incoming lines and both outgoing lines are connected to ground via a direct metallic connection of short length, this being true even though the overvoltage fault is on one line only. Thus, the affected two-line circuit is maintained in balanced condition. The element in the protector containing the fusible pellet can be removed and replaced to condition the protector for subsequent normal operation.

The protection afforded by the protector against overcurrent is provided by a heat coil assembly in each of the two lines. The heat generated in a coil by excessive current melts a fusible material, following which internal switching takes place. The switching action occurs rapidly due to the use of movable elements of small mass and spring means of adequate size. The incoming line or lines carrying the overcurrent are shunted to ground, and the outgoing lines connected to the office equipment are open circuited. This latter feature is important in that it permits the equipment to receive connections to other lines not affected with the overcurrent condition.

The protector has a visual indicating means for showing at a glance which protector in a group has been actuated by an overcurrent condition. Further, the visual indicating means has the dual function of serving as a manual reset mechanism for conditioning the protector for normal operation following correction of the overcurrent fault. In addition, the protector includes a circuit for energizing an associated audible and/or electric lamp alarm device for calling attention of nearby personnel to the fact that the protector has responded to an overcurrent fault.

Each circuit line, or "side" of the circuit pair, in the protector has a printed circuit member for establishing internal connections and for performing the switching function mentioned above. Each printed circuit member carries one of the heat coil assemblies which responds to an overcurrent condition.

Each heat coil assembly associated with a printed circuit member includes a pawl or latch and a cooperating ratchet wheel which function to effect the switch action resulting from an overcurrent fault. It is to be noted that the pawl and ratchet wheel have purely mechanical operation and are not components in the electrical circuitry. This feature, of course, avoids the uncertainties inherent in an electrical connection through a pawl and ratchet arrangement.

All terminals within the protector which engage the printed circuit members are bifurcated at their free ends, thus providing double assurance of good electrical contact. The terminal contacts have sliding action with the printed circuit members, providing a self-cleaning characteristic. The terminal members are of like size, shape and material, thereby affording economies of manufacture and assembly.

The protector housing is shaped to provide a handle for convenient manual manipulation, facilitating plug-in and removal of a protector with respect to a panel of receptacles.

DESCRIPTION OF THE PREFERRED EMBODIMENT

Figure 4:
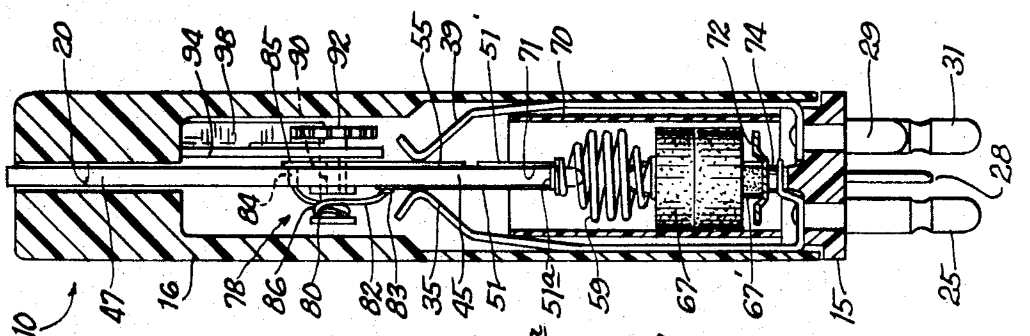
FIG. 4 is a side elevational view, partly in section, of the protector, the side portion of the housing being removed, the protector shown in normal condition.

The protector of the invention in commercial version, as will be seen from the drawings and the following description, is designed to accommodate a single communications circuit which comprises a pair of communication lines. Thus, the functional components are used in pairs, one component of each pair being related to one of the two lines.

The invention in its broader aspect is a protector for a single line, but since a communications circuit involves two lines, the protector illustrated and described is of plural character to accommodate the two lines. However, some of the appended claims are directed to a protector designed for a single line only, and the drawings and following description should be viewed with this in mind.

Referring now to the drawings, and particularly FIGS. 1—4, a plug-in line protector, generally designated 10, has a base 15 and an elongated detachable housing 16 which is generally rectangular in cross section. Base 15 and housing 16 are formed of insulating material such as molded plastic. The two may be secured together in any suitable manner, as, for example, by bosses (not shown) on base 15 which snap into apertures 17 (FIG. 1) in the housing.

The end of housing 16 remote from base 15 terminates in a hollow reduced neck portion 18 having lateral flanges 19 at its extremity, the neck portion and flanges constituting a convenient finger grip for manipulating the protector in and out of an associated receptacle (not shown). The hollow reduced neck portion 18 of housing 16 provides an opening 20 through which extends components of the protector which will be described later. Sufficient to say at this time, the components extending through opening 20 provide visual indication of the condition of the protector, and enable an attendant to see at a glance which one of many protectors in a group has been subjected to an overcurrent fault.

Base 15 of the illustrated protector has a plurality of plug-in terminal pins, namely, a first line pin 25 (FIGS. 2—4), a second line pin 26, a ground pin 27, an unconnected polarizing pin 28, a first C.O. (central office) pin 29 (FIGS. 6 and 7), a second C.O. pin 30 and an alarm pin 31.

First line pin 25 and first C.O. pin 29 are components of one of the lines through the protector, while second line pin 26 and second C.O. pin 30 are components of the other line through the protector. Ground pin 27 and alarm pin 31 are common to both lines, as will be seen, while polarizing pin 28, as the name implies, functions simply to insure that the protector is plugged into its associated receptacle with proper orientation.

Figure 3:
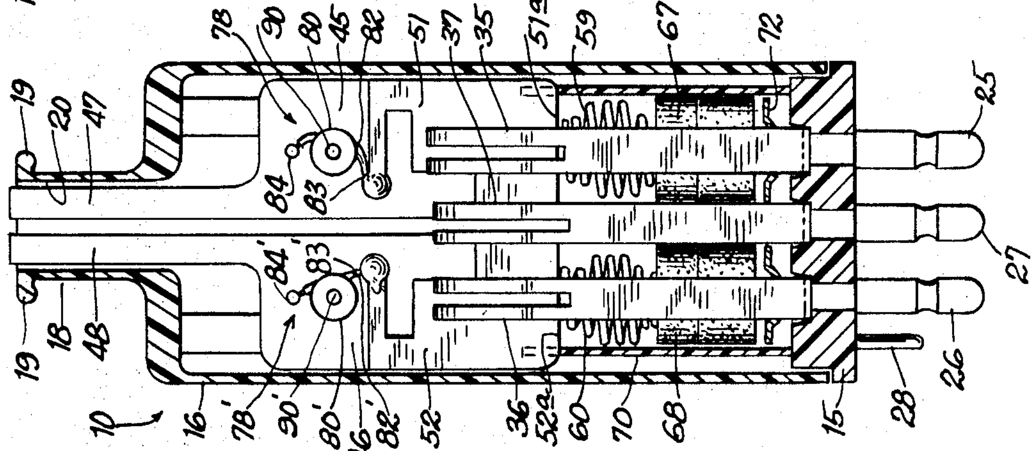
FIG. 3 is a rear elevational view, partly in section, of the protector, the rear portion of the housing being removed, the protector shown in normal condition.

Referring to FIG. 3, first and second line pins 25 and 26 are connected mechanically and electrically to elongated incoming terminals 35 and 36, respectively. Terminals 35 and 36, formed of resilient conducting material, are mounted on base 15 and disposed within housing 16. In the form shown, terminals 35 and 36 are bifurcated at the free ends thereof, the free end portions being bent as shown in FIG. 4 to provide contacts for engagement with a movable printed circuit member presently to be described. The bifurcated free ends provide two contacts on each terminal for wiping engagement with the printed circuit member, thereby insuring that desired electrical connection is made, and providing a self-cleaning characteristic.

The bent configuration of the free end portions of terminals 35 and 39 (FIG. 4) are such that when the terminals are engaged or backed up by the adjacent wall of housing 16, the free ends are spring pressed against the printed circuit member, further insuring desired electrical connection.

Ground pin 27, as shown in FIG. 3, is connected mechanically and electrically to a ground terminal 37 which is similar to the aforesaid incoming terminals 35 and 36.

Figure 6:
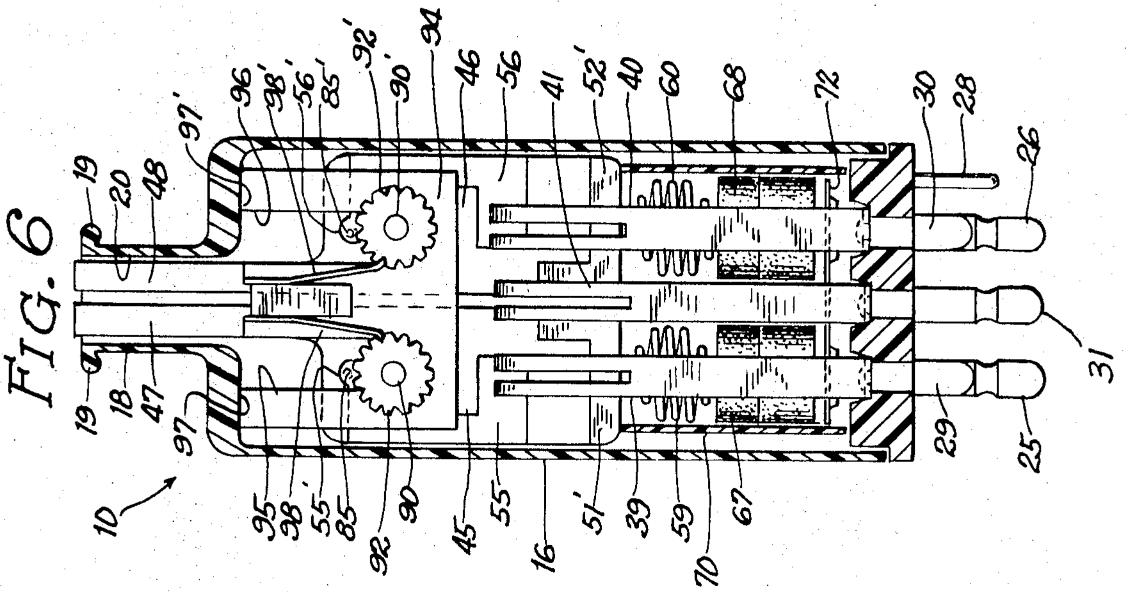
FIG. 6 is a front elevational view, partly in section, generally like FIG. 2, the protector shown in normal condition.

Referring to FIG. 6, first and second C.O. pins 29 and 30 are connected mechanically and electrically to first and second outgoing terminals 39 and 40, respectively, the terminals being the same as the previously mentioned incoming terminals 35 and 36 and ground terminal 37. Alarm pin 31 likewise is connected to an alarm terminal 41, this terminal also being elongated, bifurcated, bent and formed of resilient conducting material.

First incoming terminal 35 has opposing relation with first outgoing terminal 39, both located on one side of the protector, while second incoming terminal 36 has opposing relation with second outgoing terminal 40, the latter two terminals located on the other side of the protector, Ground terminal 37 has opposing relation with alarm terminal 41, and the former is disposed between incoming terminals 35 and 36, while alarm terminal 41 is disposed between the outgoing terminals 39 and 40, the ground and alarm terminals 37 and 41 located in the center of the protector.

Terminals 35,36,37,39,40, and 41 are identical, meaning they all can be made of the same material by the same forming machine, and assembled or replaced in a protector without regard to which is which. This, of course, affords significant manufacturing economy.

Printed circuit members, previously mentioned, are disposed within housing 16, one member between each pair of opposed incoming and outgoing terminals. Thus, as shown in FIGS. 3 and 6, printed circuit member 45 is disposed between first incoming terminal 35 and first outgoing terminal 39, and printed circuit member 46 is disposed between second incoming terminal 36 and second outgoing terminal 40. Both members 45 and 46 have portions in engagement with ground terminal 37 and alarm terminal 41.

Figures 7, 8, 9, 10, 11:
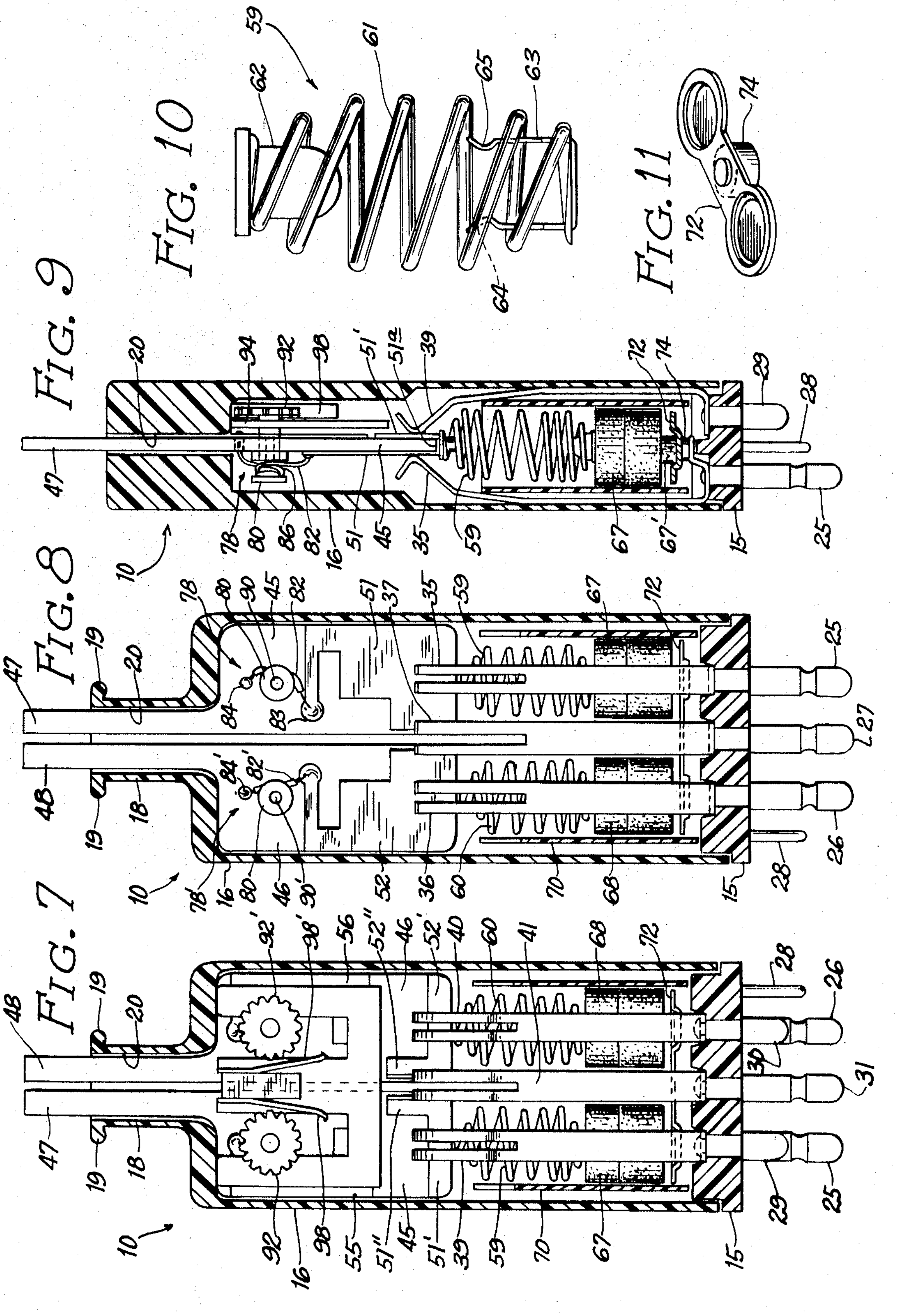
FIG. 7 is a front elevational view, partly in section, the front portion of the housing being removed, the protector shown following operation resulting from overcurrent.
FIG. 8 is a rear elevational view, partly in section, the rear portion of the housing being removed, the protector shown following operation resulting from overcurrent.
FIG. 9 is a side elevational view, partly in section, the side portion of the housing being removed, the protector shown following operation resulting from overcurrent.
FIG. 10 is an elevational view of a spring arrangement used in the protector.
FIG. 11 is a perspective view of a replaceable subassembly used in the protector.

Printed circuit members 45 and 46 are adapted to move longitudinally within housing 16 from normal inward positions, shown in FIGS. 3 and 6, to operated outward positions as shown in FIGS. 7 and 8. As will be seen later, members 45 and 46 are caused to move from inward to outward positions in fail-safe manner as a result of an overcurrent condition. When the fault condition is an overvoltage of either short or prolonged time duration, members 45 and 46 do not move, but rather stay in the normal inward position shown in FIGS. 3 and 6. If the overvoltage fault is of prolonged duration, the protector operates in another fail-safe manner, as will be seen.

Members 45 and 46 are guided in their outward movement and inward movement (the latter for resetting) by the sidewalls of housing 16, as is evident from FIGS. 3 and 6, for example.

Member 45 has a reduced extension 47, and member 46 has a reduced extension 48, the two reduced extensions lying in opening 20 of housing neck portion 18. When members 45 and 46 are in normal inward position, extensions 47 and 48 are more or less flush with the mouth of opening 20, as shown in FIGS. 3 and 6, and when members 45 and 46 are in outward positions following protector operation due to an overcurrent fault, one or both of extensions 47 and 48 protrude from the mouth of opening 20, as shown in FIGS. 7 and 8, thereby giving visual indication of the actuated protector.

The description immediately following will concern itself with the protector in relation to normal condition, and operation in response to overvoltage of either short or prolonged duration wherein printed circuit members 45 and 46 do not move.

Referring again to FIGS. 3 and 6, printed circuit members 45 and 46 on the respective rear and front surfaces are mirror images of each other insofar as the printed circuit conducting material applied thereto is concerned. Considering first the rear surfaces of members 45 and 46 (FIG. 3), they contain first printed circuit conducting material 51 and 52, respectively. In each instance, first conducting material 51 and 52 covers the entire lower portion of the rear surfaces, as well as the lower edges of the members, as shown at **51*a* in FIG. 4 and 52*a* (FIG. 3), and continuously extends upwardly therefrom on the front surfaces of members 45 and 46, as shown at 51' and 52'** in FIG. 6.

Referring to FIG. 3, incoming terminals 35 and 36 engage first printed circuit conducting material 51 and 52, respectively, in both inward and outward positions of printed circuit members 45 and 46. Material 51 and 52, however, is reduced in length along the adjacent edge portions of the members so that ground terminal 37 engages the conducting material only when members 45 and 46 are in outward position following actuation by an overcurrent fault.

Referring to FIG. 7, first conducting material 51' and 52' on the front surface of members 45 and 46 is of such short longitudinal length that outgoing terminals 39 and 40 do not make engagement therewith when members 45 and 46 are in outward position, at which time outgoing terminals 39 and 40 are in open circuit. Material 51' and 52', however, has additional length along the adjacent edges of members 45 and 46, as shown at 51'' and 52'', so alarm terminal 41 makes engagement therewith when member 45 or 46 is in outward position.

Referring again to FIG. 6, upper portions of the front surfaces of printed circuit members 45 and 46 contain second printed circuit conducting material 55 and 56, respectively. When the members 45 and 46 are in normal inward position, first outgoing terminal 39 engages material 55, while second outgoing terminal 40 engages material 56. Materials 55 and 56 continue upwardly along the outside edges of members 45 and 46 and terminate more or less centrally at the top of the members at 55' and 56'. Terminations 55' and 56' will be referred to later in describing the electrical connections between first printed circuit materials 51 and 52 and second printed circuit materials 55 and 56.

Figure 2:
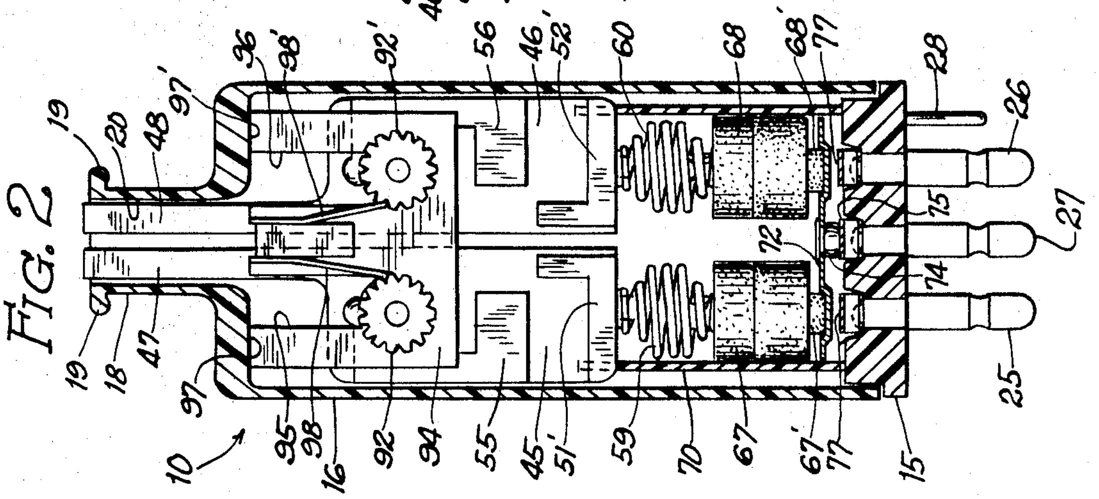
FIG. 2 is a front elevational view, partly in section, of the protector, the front portion of the housing being removed, the protector shown in normal condition.
Figure 1:
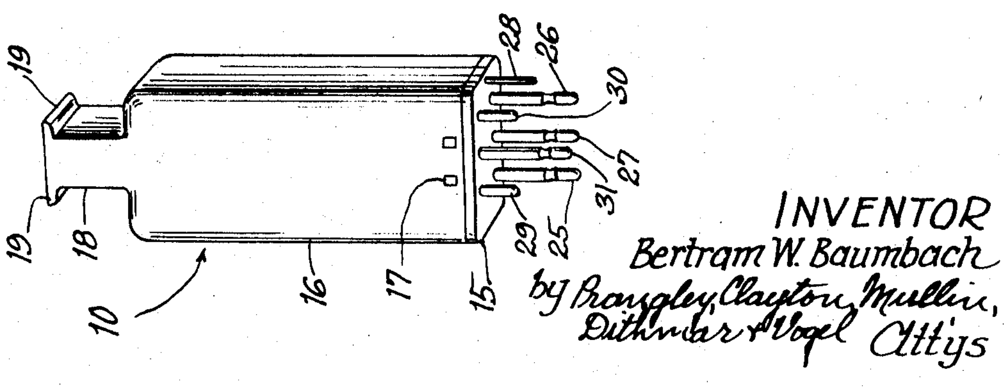
FIG. 1 is a perspective view of a plug-in line protector embodying the invention.

Referring to FIGS. 2 and 3, a pair of compressed spring means 59 and 60, respectively, engage the lower ends of printed circuit members 45 and 46. The upper ends of spring means 59 and 60 have conducting relation with first printed circuit material **51*a* and 52*a* on the lower ends of members 45 and 46**.

As shown in FIG. 10, one of the spring means, for example, spring means 59, is a helical spring 61 which tapers toward each end. In the form of the invention shown, spring means 59 and 60 are provided with electrical shunt members which are in conducting engagement when the spring means is compressed, the condition of the spring means when the protector is in normal operating condition. Thus, one end of spring 61 carries male shunt member 62, while the other spring end carries female shunt member 63. The latter is a bent resilient member having arms 64 and 65 which engage male member 62. As will be seen, spring means 59 and 60 under certain conditions of protector operation carry currents which may generate heat, and shunt members 62 and 63 carry these currents, thereby relieving spring 61 itself from the possibility of excessive heat which might inhibit proper spring operation.

Referring again to FIGS. 2 and 3, the other ends of spring means 59 and 60 engage airgap assemblies 67 and 68, respectively, carried within an insulating shell 70. The latter, carried on base 15 within housing 16, contains associated spring means 59 and 60, as well as the airgap assemblies 67 and 68 and a contact arm which will be described presently. The sides of shell 70 are provided with slots 71 (FIG. 4) to receive printed circuit members 45 and 46 when the latter are in normal inward position.

Airgap assemblies 67 and 68 are conventional, each comprising a pair of spaced carbon blocks mounted on a sleeve of insulating material. The spacing or gap between the carbon blocks, for example, 0.0035 inches, is predetermined to provide a discharge path to ground for overvoltage currents of short duration. An arc in a gap of the size mentioned will occur at voltage in excess of approximately 400 volts. Spring means 59 and 60 engage the upper of the two carbon blocks in the two airgap assemblies 67 and 68, respectively.

Still referring to FIGS. 2 and 3, the lower carbon blocks of airgap assemblies 67 and 68, designated 67' and 68' in FIG. 2, engage an elongated contact arm 72 of conducting material. Thus, airgap assemblies 67 and 68 have the lower carbon blocks 67' and 68' connected together by contact arm 72.

A pellet 74 (FIG. 2) of conducting fusible material such as solder is carried by contact arm 72, the pellet being located centrally of the arm on the lower surface. The lower part of fusible pellet 74 is in conducting engagement with a portion 75 of ground terminal 37 (FIG. 3) which in turn is connected to ground pin 27.

OPERATION IN RESPONSE TO OVERVOLTAGE OF SHORT DURATION

When an overvoltage of short duration, a voltage in excess of approximately 400 volts, for example, is applied to either first or second line pins 25 or 26, the overvoltage is impressed on associated incoming terminals 35 or 36, from which it is communicated to associated first printed circuit conducting material 51 or 52 on printed circuit members 45 or 46. It will be noted in FIG. 3 that when members 45 and 46 are in normal inward position, ground terminal 37 is not in conducting engagement with first printed circuit material 51 and 52.

The overvoltage is communicated from conducting material 51 or 52 to the associated spring means 59 or 60, and through the shunt members 62 and 63 thereof to the associated airgap assembly 67 or 68 engaged by the spring means. The overvoltage arcs across the airgap and current flows through the gap to ground through conducting contact arm 72, fusible pellet 74 (which does not melt on overvoltage of short duration), ground terminal portion 75 and ground pin 27. Pin 27, of course, connects with a grounded part (office ground) of the receptacle (not shown) in which protector 10 is plugged.

The overvoltages mentioned above which cause carbon gap operation of the protector are of relatively short duration (microseconds). This type of operation can repeat itself many times, and the voltage surges are prevented from being applied to the central office equipment connected to outgoing terminals 39 and 40 through first and second C.O. pins 29 and 30.

OPERATION IN RESPONSE TO OVERVOLTAGE OF PROLONGED DURATION

Figure 5:
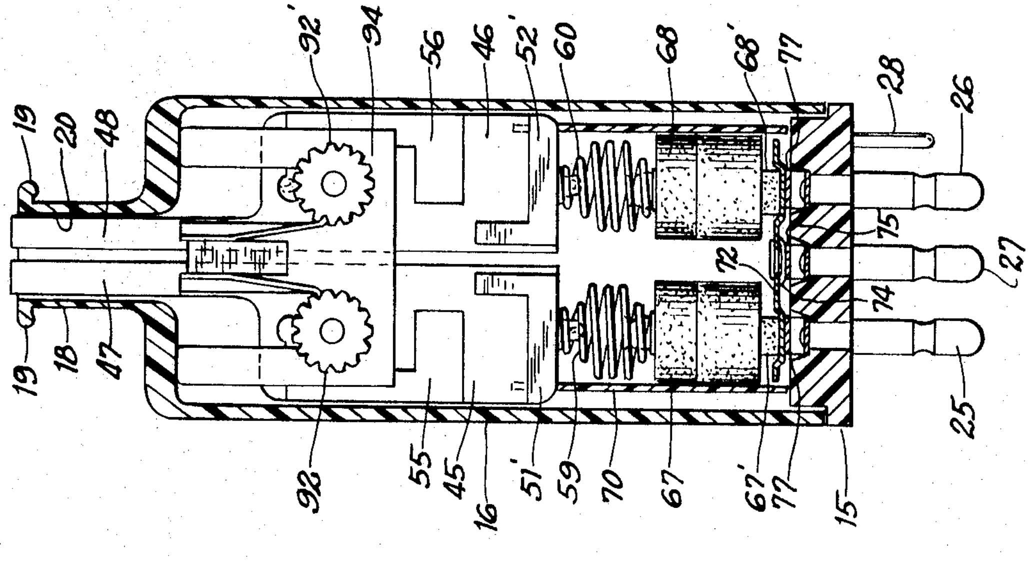
FIG. 5 is a view similar to FIG. 2, the protector shown following operation resulting from an overvoltage of relatively long time duration.

Referring to FIGS. 2 and 5, when the applied overvoltage is of prolonged duration, the heat generated by the arc and current through one or the other of the airgap assemblies 67 and 68 is transferred by conduction to contact arm 72. The heat in contact arm 72 melts pellet 74, and spring means 59 and 60 cause contact arm 72 to engage portions 77 of incoming terminals 35 and 36 which in turn are connected to first and second line pins 25 and 26. Thus, a direct metallic connection or path is provided from line pin 25 or 26 to ground through arm 72 and melted pellet 74 to portion 75 of ground terminal 37 and ground pin 27. The material of the melted pellet will flow across the top of base 15 providing additional metallic connection between line pins 25 and 26 and ground pin 27. This provision of a metallic path to ground gives the protector a fail-safe characteristic at overvoltage of prolonged duration.

The protector 10 will remain in the aforesaid state until the condition is noticed, and a new conducting contact arm 72 is installed, or the entire protector 10 is replaced with a new one. Meanwhile, protector 10 will pass high currents indefinitely without damage to central office equipment or other parts of the protector.

MECHANISM AND OPERATION FOR OVERCURRENT

Referring to FIGS. 3, 4 and 6, protector 10 is shown in normal condition with printed circuit members 45 and 46 in inward position.

Heretofore, the circuits within the protector between the incoming terminals 35 and 36 (line pins 25 and 26) and the outgoing terminals 39 and 40 (C.O. pins 29 and 30) have not been described fully. It has been mentioned, however, that incoming terminals 35 and 36 are in engagement with first printed circuit material 51 and 52 when printed circuit members 45 and 46 are in both inward and outward position (FIG. 3) and that outgoing terminals 39 and 40 are in conducting engagement with second printed circuit material 55 and 56 only when printed circuit members 45 and 46 are in inward position (FIG. 6). In order to complete the two circuits, there necessarily are electrical connections between the first and second conducting materials on the two printed circuit members. These connections, which are associated with heat responsive mechanisms, now will be described.

Referring to FIGS. 3 and 4, printed circuit member 45 is provided with a heat coil assembly 78 which includes a metal sleeve 80 extending through the member. An end portion of sleeve 80 may be knurled for a nonrotatable, force fit within a predrilled hole in member 45.

A length of resistance wire 82 has one end 83 connected electrically to first printed circuit material 51 on the rear surface of member 45, the wire 82 being wound about sleeve 80 as shown in FIG. 4. The other end portion of wire 82 passes through an aperture 84 to the opposite side of printed circuit member 45 where wire end 85 is connected electrically to the aforesaid termination 55' (FIG. 6) of second printed circuit material 55 on the front surface of member 45. Thus, first and second printed circuit materials 51 and 55 on opposite surfaces of member 45 are connected together electrically by resistance wire 82, the middle portion of which is wound around metal sleeve 80, forming a heat coil 86 (FIG. 4).

Companion printed circuit member 46 has a similar heat coil assembly 78' comprising metal sleeve 80', resistance wire 82', aperture 84', wire ends 83' and 85' (FIG. 6) and an intermediate heat coil (not shown).

Referring again to printed circuit member 45, a rotatable shaft 90 (FIGS. 3, 4 and 6) extends through sleeve 80, and on the front side of member 45 shaft 90 rigidly carries a ratchet wheel 92, the latter being spaced from the front surface of member 45, as shown in FIG. 4. The other printed circuit member 46 has a similar rotatable shaft 90' and ratchet wheel 92' (FIG. 6).

A layer of fusible material (not shown) is located between the metal sleeves 80 and 80' and the associated rotatable shafts 90 and 90' which carry the ratchet wheels 92 and 92'. When the fusible material is in unheated, solid condition, shafts 90 and 90' are held rigidly within sleeves 80 and 80'. However, when an overcurrent flows through either or both circuits in the protector, heat coil 86 or 86' develops sufficient heat to melt the fusible material, permitting one or both of ratchet wheels 92 to rotate. When melting occurs, the printed circuit member 45 or 46 carrying the heated coil will be moved to its outward position by its associated spring means 59 or 60.

Heat coil assemblies 78 and 78', by way of example, may be designed to hold a current of 0.36 amperes indefinitely. When an overcurrent of approximately 0.54 amperes or larger due to a prolonged fault condition passes through a heat coil 86 or 86', the coil generates sufficient heat to melt the fusible material which holds ratchet wheel shaft 90 or 90' fixed to its associated sleeve 80 or 80'.

In the absence of an overcurrent and the consequent operation of a heat coil 86 or 86', the printed circuit members 45 and 46 are held in inward position against the force of spring means 59 or 60 by means of a latch arrangement which now will be described.

Referring to FIGS. 4 and 6, a latch support 94 overlies the front of and is common to both printed circuit members 45 and 46. Latch support 94 is generally rectangular in shape, there being slots 95 and 96 therein (FIG. 6) entering from the top. Sleeves 80 and 80' of the heat coil assemblies extend through the slots 95 and 96, the latter permitting relative movement between latch support 94 which remains stationary and one or both of the printed circuit members 45 and 46. As shown in FIG. 6, the upper ends 97 and 97' of latch support 94 bear against the end closure wall of housing 16.

The central portion of latch support 94 carries a pair of latches 98 and 98', which latches engage ratchet wheels 92 and 92', respectively (FIG. 6). The engagement between latches 98 and 98' and ratchet wheels 92 and 92', of course, holds printed circuit members 45 and 46 in inward position against the force of spring means 59 and 60. When one or both of the ratchet wheels is permitted to turn due to heat softening of the fusible material previously mentioned, spring means 59 or 60 is permitted to move its associated printed circuit member 45 or 46 to outward position. The circuit connections when member 45 or 46 is in outward position next will be described.

A protector 10 showing both printed circuit members 45 and 46 in outward position due to an overcurrent fault on both lines is shown in FIGS. 7, 8 and 9.

Referring to the rear of protector 10 shown in FIG. 8, when printed circuit member 45 is in outward position, first incoming terminal 35 and ground terminal 37 both are in engagement with first printed circuit conducting material 51, thereby establishing a circuit to central office ground through first line pin 25, first incoming terminal 35, first conducting material 51, ground terminal 37 and ground pin 27. Thus, overcurrents at line pin 25 are shunted harmlessly to ground.

Meanwhile, referring to the front of protector 10 shown in FIG. 7, first outgoing terminal 39 has had its engagement with second printed circuit material 55 broken, thereby providing an open circuit to first C.O. pin 29 and the central office equipment (e.g., switchboard) connected thereto through the associated receptacle (not shown). This action, of course, automatically prevents any current from passing through the heat coil or into associated equipment. Further, the open circuit (instead of ground) frees the equipment, such as a switchboard, for incoming calls on other lines.

It will be recalled that extension 47 or 48 of the printed circuit members 45 and 46 protrudes from the mouth of housing neck portion 18 when the associated member is in outward position, thereby giving visual indication that one or both heat coil assemblies of a protector has been actuated.

When one or both of the heat coil circuits through protector 10 is broken as a result of heat coil action, current flow stops and the actuated heat coil, for example, coil 86, cools rapidly. The temperature drop causes the fusible material between sleeve 80 and shaft 90 to assume its original solid state, thereby again establishing a rigid connection between the sleeve and shaft. In this circumstance, of course, ratchet wheel 92 is nonrotatable.

When the overcurrent fault has been corrected, protector 10 may be reset manually for normal operation merely by pushing inwardly the then-protruding extension 47 of printed circuit member 45 to the extent permitted. Member 45 is thus resorted to the inward position previously described, and latch 98 engages ratchet wheel 92 which holds member 45 in this position against the outward bias of associated spring assembly 59.

The displaced companion printed circuit member 46 similarly is reset following an overcurrent condition, and held in normal inward position by engagement between latch 98' and ratchet wheel 92'.

Referring to FIGS. 7 and 8, the illustrated protector 10 has circuit elements, previously mentioned, adapted to be connected to an audible or electric lamp alarm which will call the attention of nearby personnel to the fact that one or more of the protectors in a group has been actuated by an overcurrent fault.

When printed circuit member 45, for example, is in outward position as a result of overcurrent, alarm terminal 41 (FIG. 7) is in engagement with first printed circuit material 51'' on the front surface of member 45. Material 51'' is integral with first printed circuit material 51 (FIG. 8) on the rear surface of member 45, and the material 51 is in engagement with ground terminal 37. Thus, an audible or electric lamp alarm device (not shown) in the central office is energized by the ground connection through alarm pin 31 (FIG. 7), alarm terminal 41, printed circuit materials 51'' and 51 (FIG. 8), ground terminal 37 and ground pin 27. When printed circuit member 45 is reset, as shown in FIG. 6, alarm terminal 41 is out of engagement with printed circuit material 51'', as shown in FIG. 6, thereby deenergizing the audible alarm device.

From the above description it is thought that the construction and advantages of this invention will be readily apparent to those skilled in the art. Various changes in detail may be made without departing from the spirit or losing the advantages of the invention.

Having thus described the invention, what I claim as new and desired to secure by Letters Patent is:

1. In a line protector for a communications circuit, the combination comprising:

a base of insulating material;

an elongated incoming terminal and an opposing elongated outgoing terminal mounted on said base, said terminals of resilient conducting material;

a ground terminal mounted on said base;

an insulating member having printed circuit conducting material thereon disposed between said resilient incoming and outgoing terminals, said terminals engaging said conducting material;

compressed spring means engaging said printed circuit conducting material on said member; and an airgap assembly, a contact member and a solder pellet disposed between said spring means and said ground terminal, said solder pellet maintaining said contact member and said incoming terminal in spaced relation;

whereby overvoltage of short duration on said incoming terminal produces an arc in said airgap assembly and current flow therethrough to said ground terminal, and overvoltage of longer duration causes said pellet to melt and said contact member under force of said spring means to engage said incoming terminal, thereby providing a metallic path to said ground terminal through said contact member which is moved into engagement with said incoming terminal by said spring means.

2. The combination of claim 1 with the addition of a housing of insulating material detachably mounted on said base, said housing having walls engaging said resilient incoming and outgoing terminals and urging said terminals into contacting relation with said conducting material on said insulating member.

3. The combination of claim 1 wherein said spring means includes opposing conducting elements which engage each other in conducting relation when said spring means is compressed, thereby providing a low resistance current path shunting said spring means effective to prevent current flow through said spring means of a magnitude to generate damaging heat in said spring means.

4. The combination of claim 1 with the addition of an over current protective means comprising:

a releasable heat-responsive mechanism mounted on said insulating member and having means positioning said member at an inward position in opposition to the force exerted by said spring means, and resistance wire associated with said heat-responsive mechanism and connected between spaced portions of said printed circuit conducting material on said insulating member contacting said incoming and outgoing terminals when said insulating member is in inward position, an overcurrent in said wire generating sufficient heat to release said heat-responsive mechanism and permit said spring means to move said insulating member to an outward position;

whereby an overcurrent through said resistance wire releases said heat-responsive mechanism and said spring means moves said insulating member to its outward position, grounding said incoming terminal and opening said outgoing terminal.

5. The combination of claim 4 wherein said housing provides a guide for said insulating member and has an opening at the end thereof remote from said base, and wherein said insulating member has an elongated portion which is generally flush with the mouth of said opening when said insulating member is in inward position and protrudes from said opening when said insulating member is in outward position, thereby providing visual indication of an overcurrent condition, said elongated portion being manually movable to reset said insulating member to inward position following operation of said heat-responsive mechanism.

6. In a line protector for a communications circuit, the combination comprising:

a base of insulating material;

a pair of spaced elongated incoming terminals and a pair of opposing elongated outgoing terminals mounted on said base, said terminals of resilient conducting material;

an elongated ground terminal of resilient conducting material mounted on said base;

a pair of insulating members having printed circuit conducting material thereon, each of said members disposed between one set of said resilient incoming and opposing outgoing terminals, said terminals engaging said conducting material;

a pair of compressed spring means, each spring means engaging said printed circuit conducting material on one of said insulating members;

a pair of airgap assemblies, each airgap assembly engaging a spring means connecting with one of said insulating members; and a metallic contact member and a solder pellet disposed between said pair of airgap assemblies and said ground terminal, said solder pellet engaging said ground terminal and maintaining said contact member spaced from said pair of incoming terminals;

whereby overvoltage of short duration on either of said incoming terminals produces an arc in its associated airgap assembly and current flow therethrough to said ground terminal through said contact member and said solder pellet, and overvoltage of longer duration on either of said incoming terminals causes said solder pellet to melt and said contact member under force of said spring means to engage both said incoming terminals, thereby providing a metallic path from both said incoming terminals to said ground terminal.

7. The combination of claim 6 with the addition of a housing of insulating material detachably mounted on said base, said housing having walls engaging said resilient incoming and outgoing terminals and urging said terminals into contacting relation with said conducting material on said insulating members.

8. The combination of claim 6 wherein each one of said spring means includes opposing conducting elements which engage each other in conducting relation when said spring means is compressed, thereby providing a low resistance current path shunting said spring means effective to prevent current flow through said spring means of a magnitude to generate damaging heat in said spring means.

9. The combination of claim 6 with the addition of an overcurrent protective means comprising:

a pair of releasable heat-responsive mechanisms, one mechanism mounted on each of said insulating members and having means positioning said member at an inward position in opposition to the force exerted by its associated spring means, and resistance wire associated with each heat-responsive mechanism and connected between spaced portions of said printed circuit conducting material on the associated insulating member contacting a set of incoming and outgoing terminals when said insulating member is in inward position, an overcurrent in said wire generating sufficient heat to release said heat-responsive mechanism and permit the associated spring means to move said insulating member to an outward position;

whereby an overcurrent through a resistance wire releases its associated heat-responsive mechanism and the associated spring means moves the associated insulating member to its outward position, grounding said incoming terminal and opening said outgoing terminal.

10. The combination of claim 9 wherein said housing provides a guide for said insulating members and has an opening at the end thereof remote from said base, and wherein each of said insulating members has an elongated portion which is generally flush with the opening mouth when said insulating member is in inward position and protrudes from said opening when said insulating member is in outward position, thereby providing visual indication of an overcurrent condition, said elongated portion being manually movable to reset said insulating member to inward position following operation of the associated heatrresponsive mechanism.

11. The combination of claim 10 wherein the end of said housing remote from said base is shaped to provide a handle for ready manipulation of said protector, said opening for said elongated portions located in the end of the handle.

12. The combination of claim 9 wherein each heat-responsive mechanism comprises:

a metallic sleeve extending through an insulating member and rigidly carried thereby, said sleeve spaced from said printed circuit conducting material on said member and having said resistance wire mounted thereon;

a metallic shaft within said sleeve;

a ratchet wheel secured to a protruding end of said shaft;

meltable material between said sleeve and said shaft maintaining rigidity between sleeve and shaft when solid and permitting shaft rotation when melted; and pawl means fixed with respect to said base engaging said ratchet wheel and serving to hold said insulating member at an inward position against the force applied by said spring means;

whereby an overcurrent through said resistance wire generates sufficient heat to melt said meltable material, permitting rotation of said ratchet wheel and movement of said insulating member to outward position by said spring means.

13. The combination of claim 9 wherein said incoming and said outgoing terminals are bifurcated at the ends thereof engaging said insulating members having printed circuit conducting material thereon, thereby providing multiple contact in each instance.

14. The combination of claim 9 wherein said metallic contact member and said solder pellet are unitary, and removable and replaceable in the protector.

15. The combination of claim 9 wherein each insulating member has connecting first printed circuit conducting material on portions of both sides thereof and at the end thereof engaged by said spring means, said first conducting material engaged by said incoming terminals when said insulating member is in both inward and outward position and by said ground terminal when in outward position only, and second printed circuit conducting material engaged by said outgoing terminals only when said insulating member is in inward position, said resistance wire connected between said first and second printed circuit conducting materials.

16. The combination of claim 6 with the addition of a housing of insulating material disposed between said incoming and outgoing terminals, said housing containing said pair of spring means, said pair of airgap assemblies and said contact member and solder pellet.